(12) United States Patent
Höpfner

(10) Patent No.: US 11,912,179 B2
(45) Date of Patent: Feb. 27, 2024

(54) SEAT RAIL MODULE FOR A VEHICLE SEAT FOR VEHICLE SEAT DECELERATION IN THE EVENT OF A CRASH

(71) Applicant: Brose Fahrzeugteile SE & Co. Kommanditgesellschaft, Coburg, Coburg (DE)

(72) Inventor: Andreas Höpfner, Hildburghausen (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 1061 days.

(21) Appl. No.: 16/636,055

(22) PCT Filed: Jul. 31, 2018

(86) PCT No.: PCT/EP2018/070674
§ 371 (c)(1),
(2) Date: Apr. 24, 2020

(87) PCT Pub. No.: WO2019/025408
PCT Pub. Date: Feb. 7, 2019

(65) Prior Publication Data
US 2020/0307425 A1    Oct. 1, 2020

(30) Foreign Application Priority Data
Aug. 2, 2017 (DE) ..................... 10 2017 117 534.2

(51) Int. Cl.
*B60N 2/42* (2006.01)
*B60N 2/427* (2006.01)

(52) U.S. Cl.
CPC ......... *B60N 2/4214* (2013.01); *B60N 2/4279* (2013.01); *B60N 2/42709* (2013.01); *B60N 2/42736* (2013.01); *B60N 2/42781* (2013.01)

(58) Field of Classification Search
CPC .............. B60N 2/0155; B60N 2/01525; B60N 2/01516; B60N 2/4214; B60N 2/42709;
(Continued)

(56) References Cited

U.S. PATENT DOCUMENTS 3,917,020 A    11/1975    Saab
5,349,878 A     9/1994    White et al.
(Continued)

FOREIGN PATENT DOCUMENTS

CN    202966008 U    6/2013
DE       2216378 A1   10/1973
(Continued)

OTHER PUBLICATIONS

Office Action for Chinese Patent Application No. 2018800590749 dated Jun. 24, 2020 and its partial English translation.
PCT/EP2018/070674; PCT International Search Report and Written Opinion of the International Searching Authority dated Oct. 25, 2018 and its English translation.
102017117534.2; Search Report of the German Patent and Trademark Office dated Jun. 13, 2018.

*Primary Examiner* — Alfred J Wujciak
(74) *Attorney, Agent, or Firm* — Dickinson Wright PLLC

(57) ABSTRACT

A seat rail module for a vehicle seat, comprising two longitudinal adjustment rails (10) arranged parallel to each other for guiding the vehicle seat (1) and adjusting its position in longitudinal direction, deformation units (18) which can be fastened or are fastened to the longitudinal adjustment rails (10), and fastening members (25) for fastening the seat rail module to the floor of a vehicle body, wherein the vehicle seat (1) can be fastened to the longitudinal adjustment rails (10) and the deformation units (18) are configured for deforming deformation members (19) when the vehicle seat is displaced in a main direction of travel, in order to decelerate the vehicle seat in the event of a crash, (Continued)

characterized in that the fastening members (25) are configured to fasten the seat rail module to the floor of the vehicle body by means of locking, and in that the fastening members (25) are mechanically unlocked when the vehicle seat (1) is displaced in longitudinal direction in the direction opposite to the main direction of travel beyond a predetermined limit line (8).

Also in the rear area in which the vehicle seat assumes a seat position which is shifted relatively far backward, such as will be possible in the future for 'autonomous driving' or as a relax position, precautions for occupant protection are provided to a sufficient extent, even if front occupant protection systems, in particular front airbags, are no longer effective in this area.

21 Claims, 10 Drawing Sheets

(58) Field of Classification Search
CPC ............ B60N 2/42736; B60N 2/42781; B60N 2/4279
USPC ..... 248/424, 429, 419, 420; 297/311, 216.1; 296/65.01, 65.13, 65.15, 65.18
See application file for complete search history.

(56) References Cited

U.S. PATENT DOCUMENTS

| | | | |
|---|---|---|---|
| 5,482,351 A * | 1/1996 | Young | B64D 25/04 297/216.2 |
| 8,616,515 B2 * | 12/2013 | Hayashi | B60N 2/085 296/65.13 |
| 2005/0082890 A1 | 4/2005 | Taubmann et al. | |
| 2013/0025388 A1 | 1/2013 | Flieger et al. | |
| 2013/0147241 A1 | 6/2013 | Park et al. | |
| 2014/0152065 A1 | 6/2014 | Boehm et al. | |
| 2014/0265470 A1 | 9/2014 | Suzuki et al. | |
| 2022/0274513 A1 * | 9/2022 | Höcks | B60N 2/0715 |
| 2023/0158924 A1 * | 5/2023 | Amstein | B60N 2/42709 248/429 |

FOREIGN PATENT DOCUMENTS

| | | |
|---|---|---|
| DE | 202007006908 U1 | 10/2008 |
| DE | 102012218722 A1 | 4/2014 |
| DE | 102013102224 A1 | 9/2014 |
| GB | 2369772 A | 6/2002 |
| WO | 2006068567 A1 | 6/2006 |

\* cited by examiner

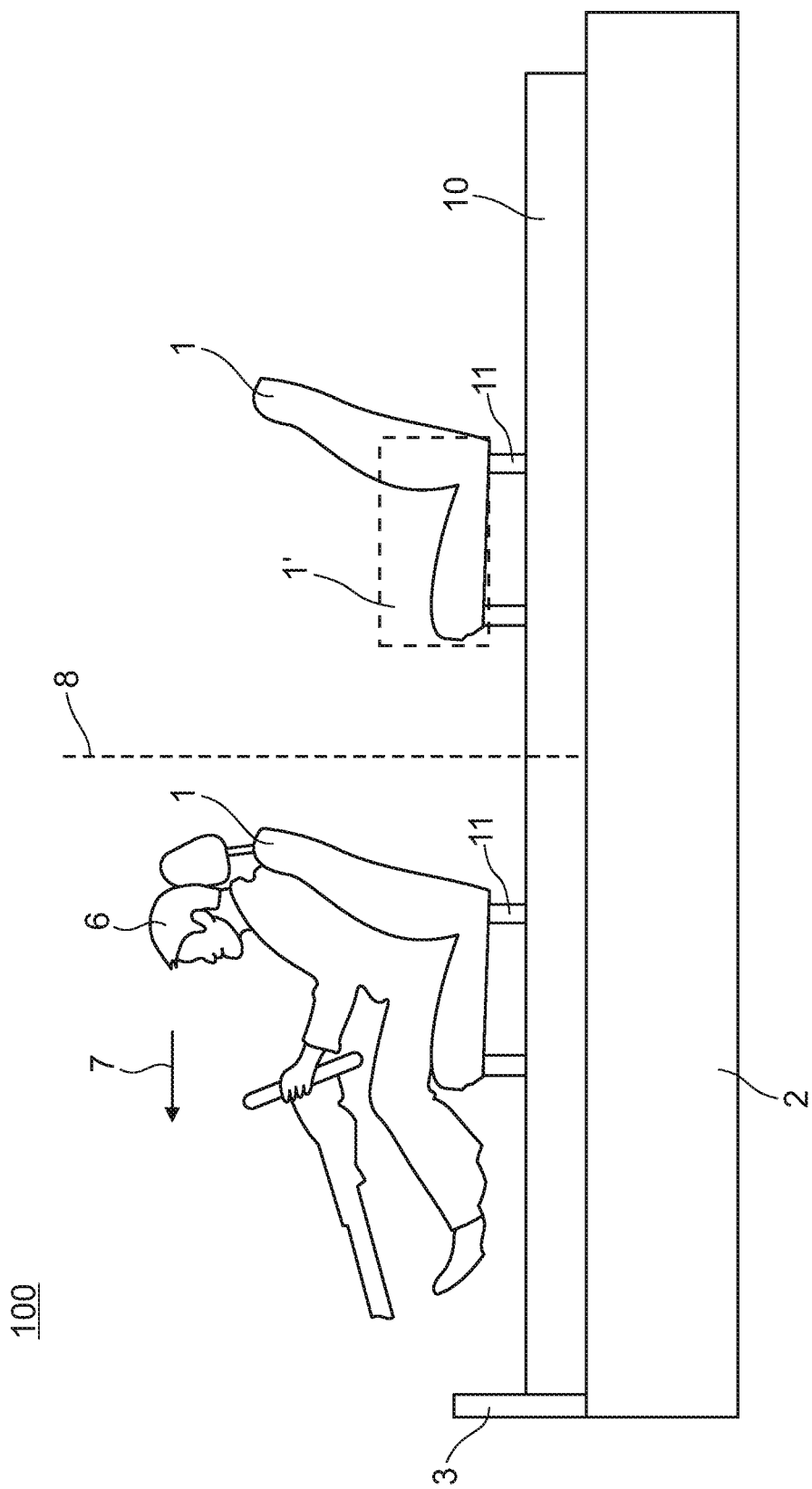

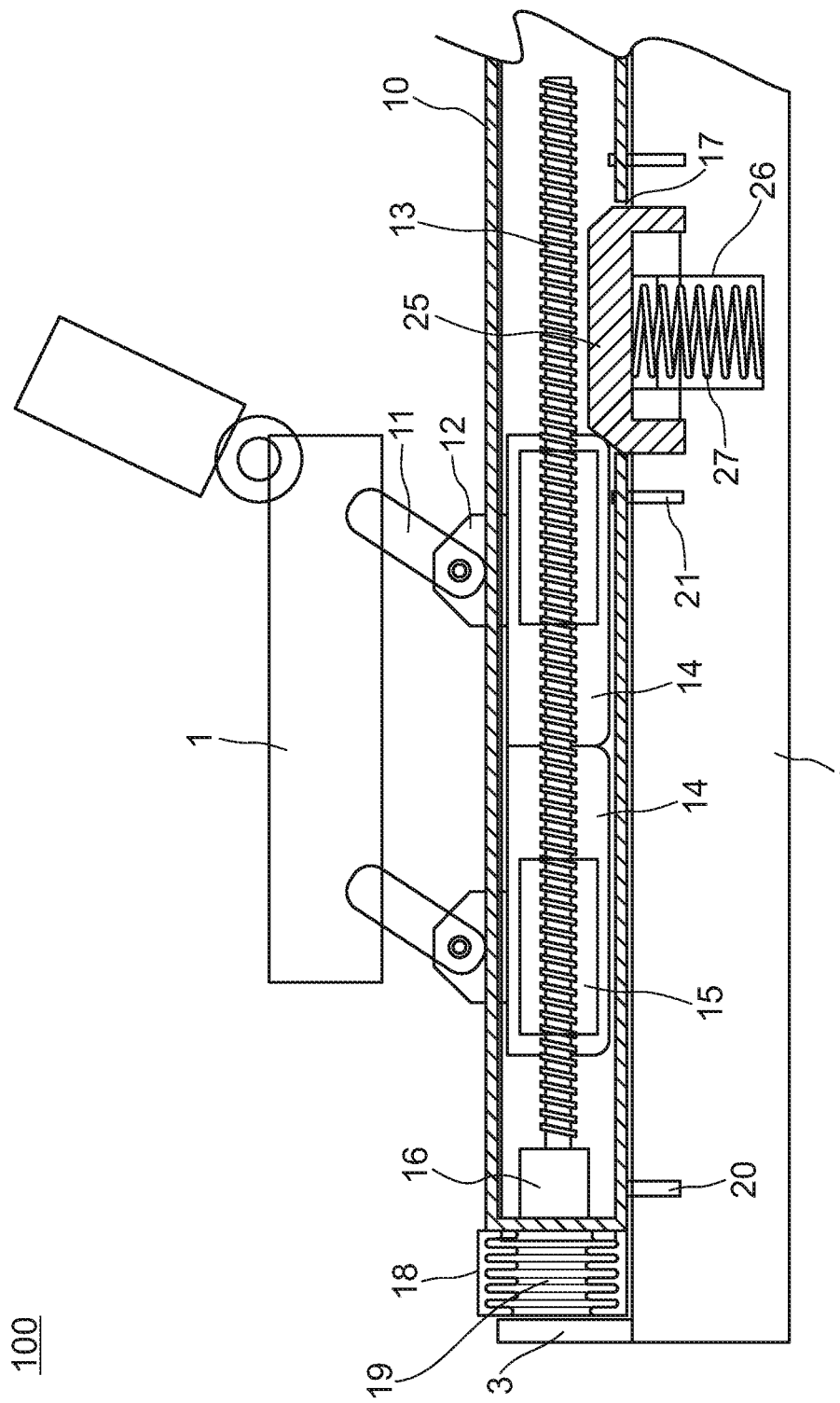

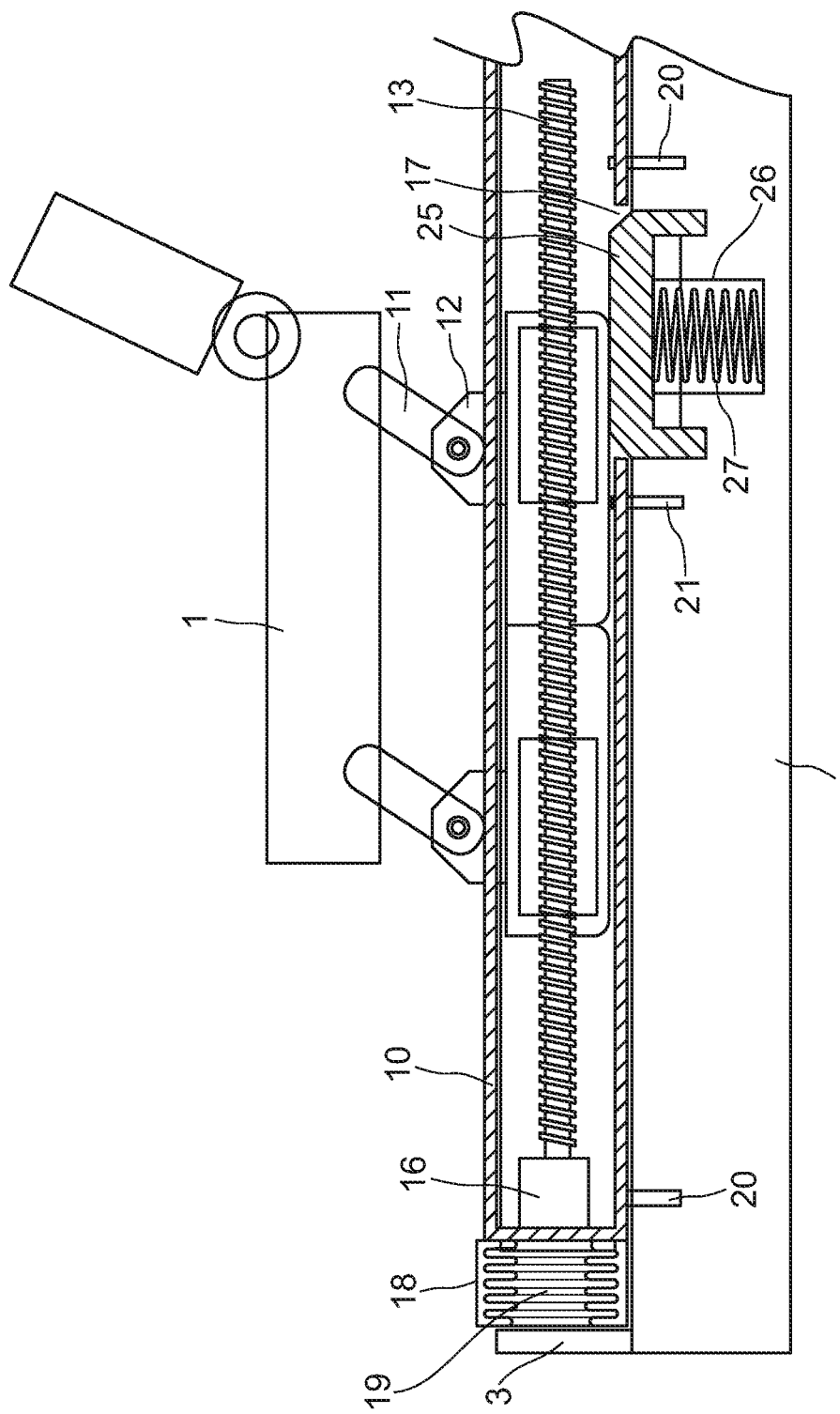

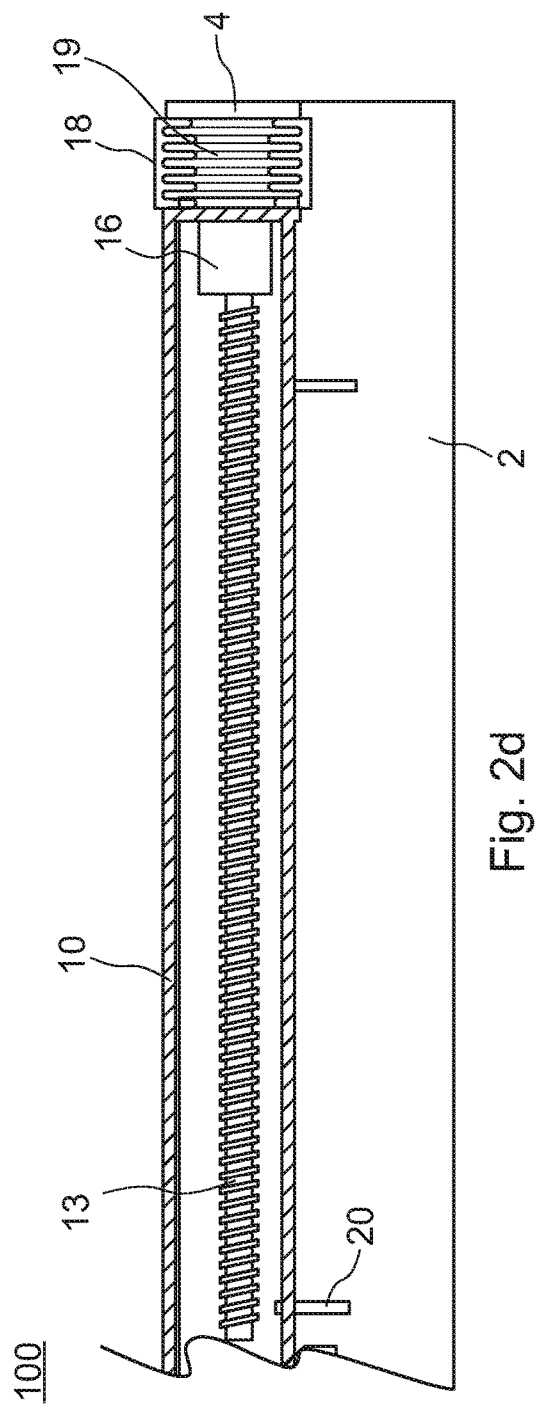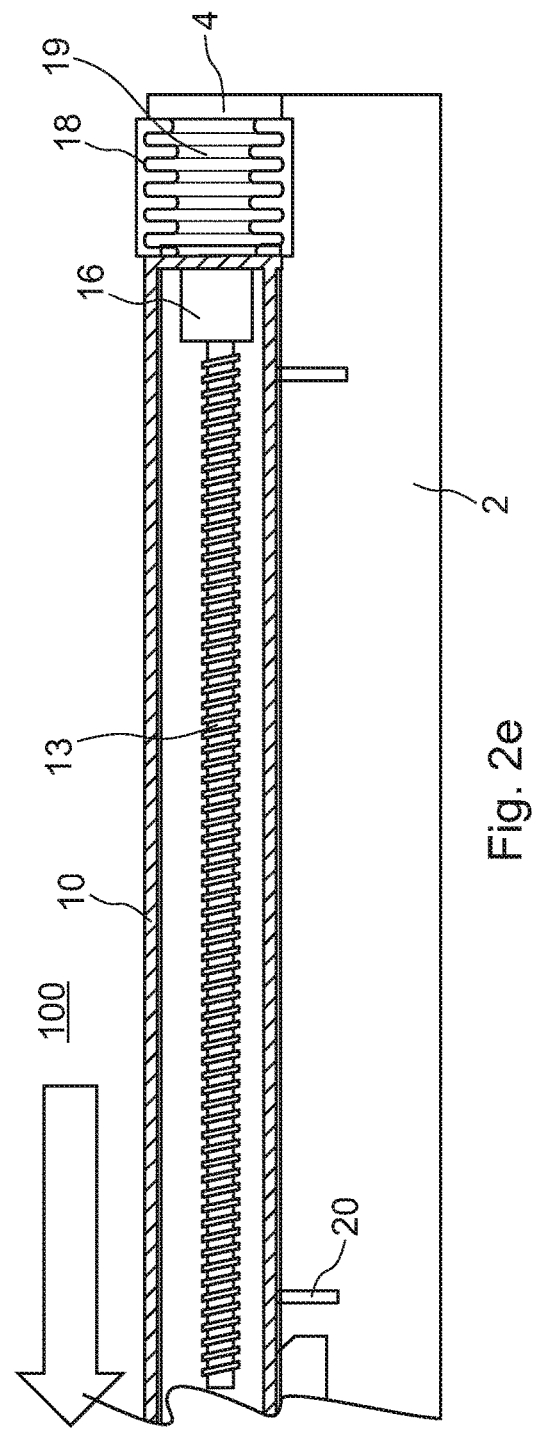

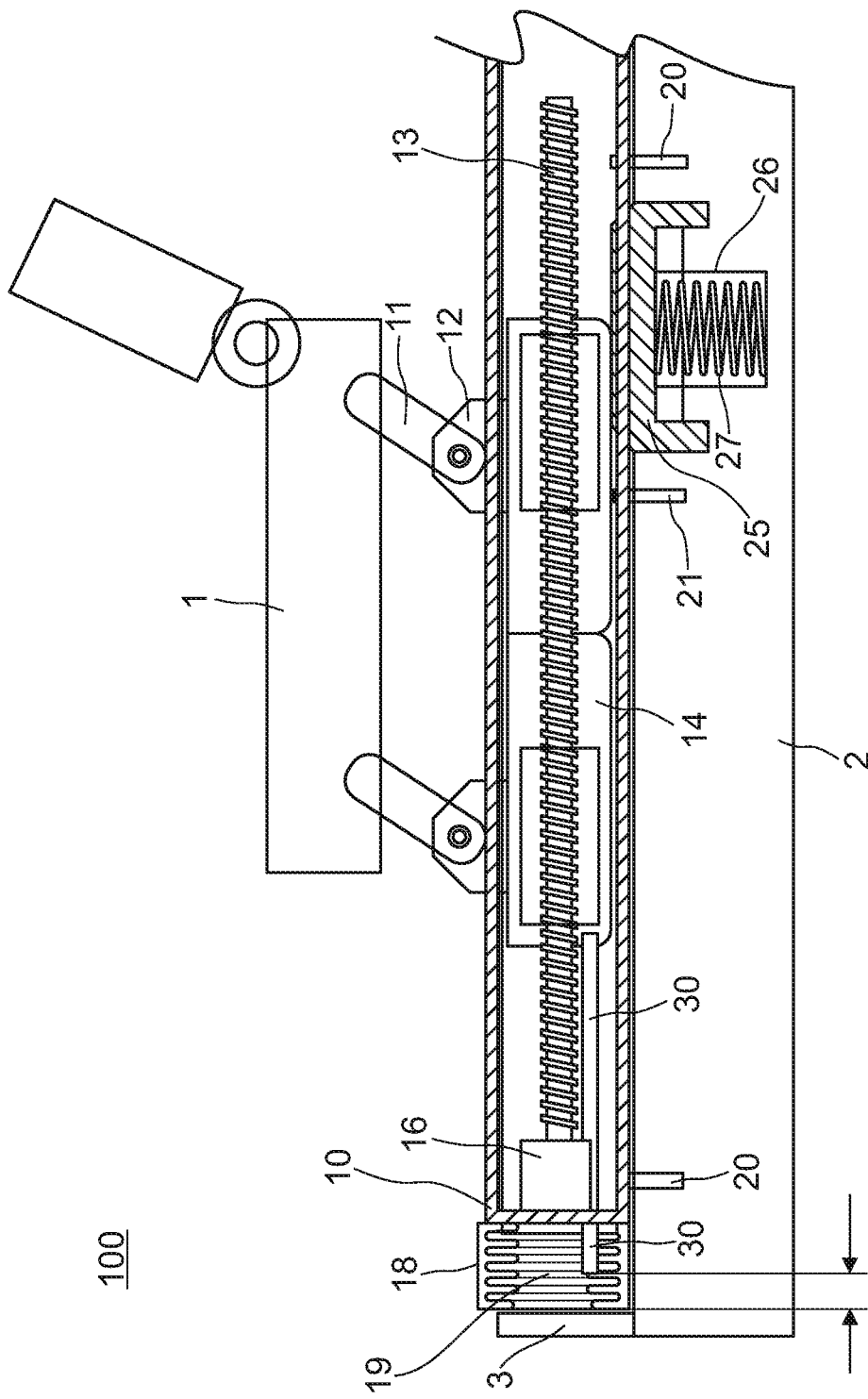

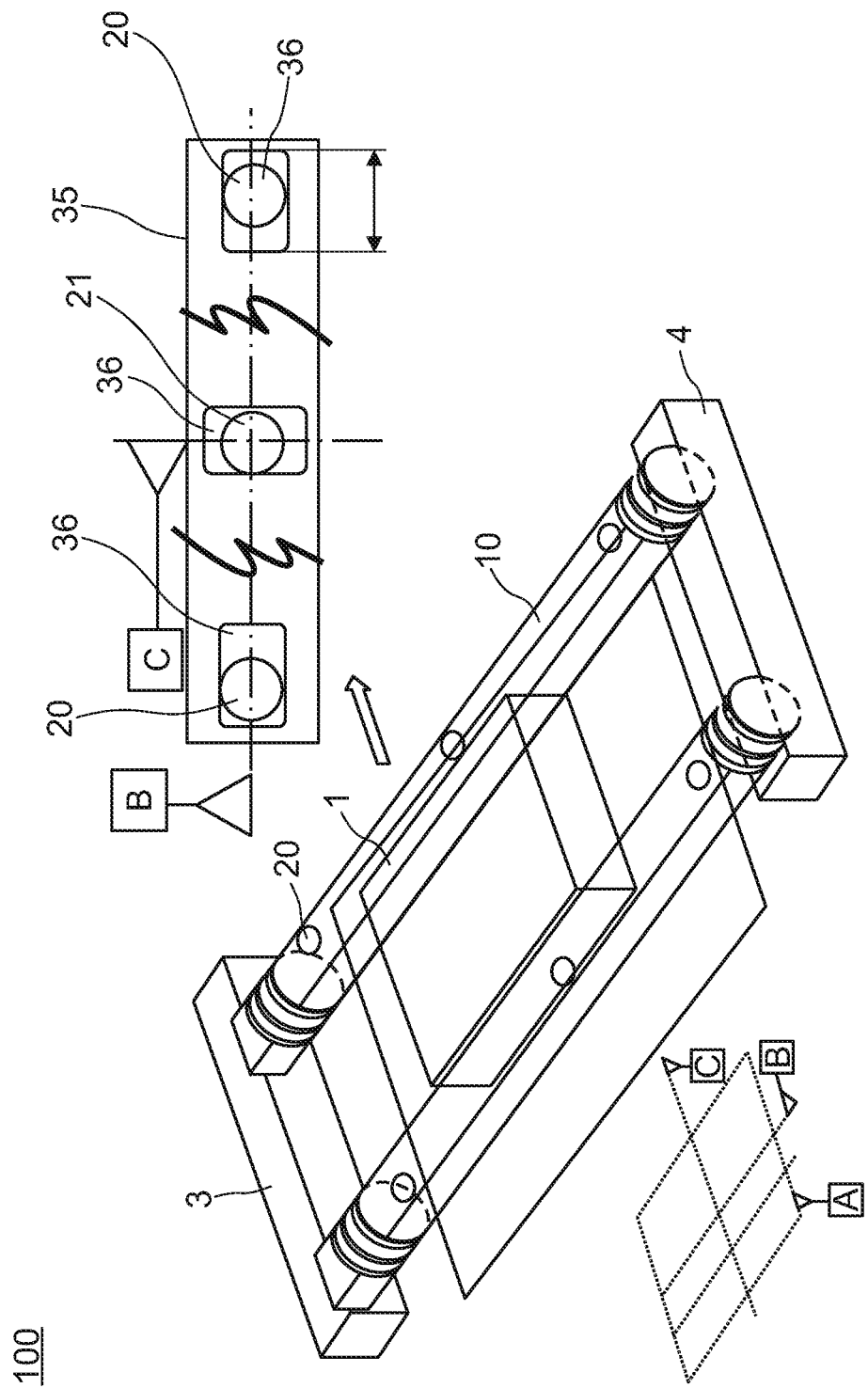

SEAT RAIL MODULE FOR A VEHICLE SEAT FOR VEHICLE SEAT DECELERATION IN THE EVENT OF A CRASH

The present application is a U.S. National Stage Application based on and claiming benefit and priority under 35 U.S.C. § 371 of International Application No. PCT/EP2018/070674, filed 31 Jul. 2018, which in turn claims benefit of and priority to German Application No. 10 2017 117 534.2 filed 2 Aug. 2017, the entireties of both of which are hereby incorporated herein by reference.

FIELD OF INVENTION

The present invention relates generally to a seat rail module for a vehicle seat, in particular for a motor vehicle seat, and relates in particular to a seat rail module with provisions for a deceleration of the vehicle seat that is solely mechanically triggered in the event of a crash, in particular for decelerating a vehicle seat in areas outside the range of action of conventional front passenger protection systems, in particular front airbags.

PRIOR ART

The design of vehicles must take sufficient account of occupant safety measures. In the case of front seats in vehicles, this is primarily achieved by means of frontal occupant protection systems, such as seat belt systems, belt tensioners and front airbags, which are intended to restrain occupants at a relatively late stage of a crash and provide additional protection, particularly for the head and neck area.

Additional protective measures include so-called seat-based restraint systems, which are coupled to a seat rail module and, in the event of a crash, yield to a crash impulse in a controlled manner while absorbing energy.

Various units for decelerating vehicle seats are known from the prior art. DE 10 2012 218 722 A1 discloses such a unit for decelerating a vehicle seat, comprising deformation units which are fastened or can be fastened to the front and/or rear ends of a vehicle seat and which cooperate with deformation members which are tubular and taper conically at their ends in order to dissipate impact energy in a controlled manner in the event of a crash. A sensor system and an electronic control unit are assigned to the unit for decelerating the vehicle seat. The sensor system comprises sensors, such as inertial sensors, which collect information at a very early stage of a crash to provide signals that are indicative of the severity of a crash. Sensor signals of predictive sensors, such as radar sensors or ultrasonic sensors, may also be additionally analyzed. The stiffness of the unit for decelerating the vehicle seat is then adjusted on the basis of the degree of the severity of the crash that has been determined.

Loops are used for this purpose, which surround the conically tapered ends of the tubular deformation members and are adjusted in axial direction. The actuation of the unit for decelerating the vehicle seat thus requires suitable electronics and a control system, which means that additional precautions need to be taken in the event of failure of the electronics or control system or the vehicle electrics.

In connection with novel interior concepts of motor vehicles and in particular 'autonomous driving', new types of seat positions of the driver or front passenger will arise in the future, which, compared to the previous 'conventional seat positions', may in some cases lie outside the range of action of front occupant protection systems, in particular outside the range of action of front airbags. Furthermore, relax positions can also be taken as seat positions in vehicles, e.g. by front passengers while driving, which are not upright and thus also lie clearly 'behind' those driver seat positions in which front occupant protection systems, in particular front airbags, are effective.

The aforementioned novel seat and occupant positions by the driver and front passenger can generally only be adjusted if the rear row of seats is not occupied or has even been moved back into a 'stowage position', which allows the driver seat or front passenger seat to be adjusted very far to the rear and beyond the range of action of front occupant protection systems. This in turn creates additional distance and movement space in the event of a front crash or rear-end crash, resulting in a deterioration in the effectiveness of occupant restraint systems, which is undesirable.

SUMMARY OF INVENTION

In view of this background, the problem to be solved by the present invention is to provide simple, reliable and effective measures for occupant safety, in particular for new types of seat positions of the driver or front passenger which will arise in the future, for example during 'autonomous driving'. In particular, according to the present invention there is to be provided an improved seat rail module for a vehicle seat which can be manufactured and mounted in a vehicle at low cost and which enables reliable and effective measures for passenger safety over a very wide adjustment range of the vehicle seat.

This problem is solved by a seat rail module for a vehicle seat as claimed by claim 1. Further advantageous embodiments are the subject-matter of the dependent claims.

According to the present invention, there is provided a seat rail module for a vehicle seat, in particular for a motor vehicle seat, comprising two longitudinal adjustment rails arranged parallel to each other for guiding the vehicle seat and for adjusting a position thereof in longitudinal direction, deformation units which can be fastened or are fastened to the longitudinal adjustment rails, and fastening members for fastening the seat rail module to the floor of a vehicle body. Here, the vehicle seat can be fastened to the longitudinal adjustment rails, the deformation units being configured to deform deformation members when the vehicle seat is displaced in a main direction of travel of the vehicle in order to decelerate the vehicle seat in the event of a crash.

According to the present invention, the fastening members are configured to fasten the seat rail module to the floor of a vehicle body by means of locking, wherein the fastening members as mechanically unlocked when the vehicle seat is displaced in longitudinal direction and in the direction opposite to the main direction of travel of the vehicle beyond a predetermined limit line.

The term 'main direction of travel' of the vehicle shall mean in particular a direction of travel of the vehicle in which the vehicle will travel for the predominant part of its operation, which normally corresponds to the forward direction, because the vehicle will normally travel forwards most of the time during operation. The longitudinal adjustment rails usually each have a lower rail which can be fastened firmly to the floor of the vehicle body and an upper rail which can be displaced relative to the lower rail in longitudinal direction and to which the vehicle seat is fastened. The appropriate seat position is determined by means of locking the upper rail to the lower rail in the standard manner by means of a locking device. The deformation members of the deformation units are used to dissipate impact energy in the event of a crash in a targeted manner by deformation. For this purpose, the deformation units are usually arranged at least between the front ends of the longitudinal adjustment rails and a section of the vehicle body, preferably both between the front ends of the longitudinal adjustment rails and an associated section of the vehicle body and also between the rear ends of the longitudinal adjustment rails and an associated section of the vehicle body. For particularly effective reduction of impact energy in the event of a crash, the deformation members can be deformed in particular by inelastic and irreversible deformation.

For coupling the vehicle seat sufficiently rigidly to the vehicle body in a normal state, the seat rail module is locked to the floor of the vehicle body by means of the fastening members. For this purpose, a positive engagement of the fastening members in mating members of corresponding shape is preferred. The fastening members themselves may be formed as male positive-fit structures, in particular with projections, or alternatively as female positive-fit structures, in particular with openings or receptacles, while the mating members may be formed correspondingly as female positive-fit structures, in particular with openings or receptacles, or alternatively as male positive-fit structures, in particular with projections.

According to the present invention, this locking effect, which causes the locking and rigid coupling of the vehicle seat and vehicle body, can be released by means of a simple mechanical unlocking if the vehicle seat is moved backwards beyond a predetermined limit line in the direction opposite to the main direction of travel defined above. According to the present invention, this release of the locking position occurs automatically, by means of a purely mechanical interaction of the seat rail module with the fastening members or with the associated unlocking members, without the need for complex and failure-prone electronics and sensors.

The above-mentioned limit line is suitably defined by the transition between a front area within which the above-mentioned front occupant protection systems, in particular front airbags, can be operated to a sufficient extent and a rear area further to the rear in the main direction of travel within which the above-mentioned front occupant protection systems, in particular front airbags, can no longer be operated to a sufficient extent to effectively protect the driver or front passenger. The rear area is in particular an area in which the vehicle seat occupies a seat position which is displaced relatively far to the rear, such as that which will be adopted in the future for 'autonomous driving', for example, or a relax position as a seat position which may not be upright either and which in any case is also clearly 'behind' those driver seat positions in which front-seat occupant protection systems, in particular front airbags, are effective.

The exact position of this transition area and of the above-mentioned limit line depends both on the geometry of the vehicle and of the vehicle seat and on the technical and geometric design of the front passenger protection systems, in particular front airbags, and may vary according to the specifications of the vehicle manufacturer. By simple geometrical design of the seat rail module, according to the present invention all these requirements can be met in a simple and cost-effective manner. In the aforementioned rear area, there is thus additional distance and movement space available for the driver or front passenger, which can significantly increase the comfort behavior of the vehicle seat. However, because in this rear area the impact energy can be effectively dissipated by the possibility of deformation of the deformation members in the event of a crash, i.e. in the event of an acceleration higher than a threshold value that can be preset, and because the driver or front passenger can then be adequately restrained by means of the front occupant protection system, in particular by means of the front airbag, when the front area is reached, according to the present invention sufficient occupant safety is adequately ensured in all positions of the vehicle seat.

According to a further embodiment, the fastening members are resiliently biased against the longitudinal adjustment rails, wherein the fastening members are in engagement with correspondingly formed mating members on an underside of the longitudinal adjustment rails in a normal state and are not in engagement anymore with the mating members when the vehicle seat is displaced in longitudinal direction and in the direction opposite to the main direction of travel beyond the predetermined limit line. Due to the mechanical pretension, the fastening members automatically engage with the mating members in the normal state in order to ensure a sufficiently rigid coupling between the vehicle seat and the vehicle body. However, when the vehicle seat is displaced in longitudinal direction to the rear and the aforementioned 'rear area' is reached, according to the present invention this engagement is automatically mechanically released, whereby additional protective measures, in particular by means of the secondary fastening members described hereinafter, can ensure a sufficiently rigid coupling between the vehicle seat and the vehicle body also in the rear area, whereby this mechanical coupling is less strong in the 'rear area' than in the aforementioned 'front area'.

By means of the mechanical pretension, the fastening members can virtually scan the position of the longitudinal adjustment rails, if viewed in the main direction of travel, in that a sliding contact of the fastening members with the undersides or side surfaces of the longitudinal adjustment rails is implemented in the aforementioned rear area and in that the fastening members are automatically displaced by means of the mechanical pretension in the aforementioned front area into a second position, in which the aforementioned mechanical engagement between the fastening members and the correspondingly formed mating members is reliably accomplished. Due to the mechanical pretension of the fastening members against the longitudinal adjustment rails, this engagement cannot be inadvertently released again, but only if the vehicle seat is again displaced beyond the aforementioned limit line into the aforementioned rear area by adjusting the longitudinal adjustment rails.

According to a further embodiment, the correspondingly formed mating members are formed as slot holes on the undersides of the longitudinal adjustment rails and are configured for the engagement with male positive-fit structures, in particular with spring-biased locking members, which serve as fastening members in the aforementioned front area. Due to the mechanical pretension of the fastening members against the undersides of the longitudinal adjustment rails, the fastening members permanently scan the position of the slot holes on the undersides of the longitudinal adjustment rails. If the limit line to the aforementioned rear area is overrun by adjusting the vehicle seat to the rear, the locking of the fastening members is automatically released. Here, the front area is simply defined by the position of the slot holes in the main direction of travel.

According to a further embodiment, the longitudinal adjustment rails accommodate pressers for pressing down the fastening or locking members, which are coupled to the vehicle seat and thus indicate its position in the main direction of travel, wherein the pressers release or unlock the engagement between the fastening members and the mating members when the vehicle seat is displaced in longitudinal direction and in the direction opposite to the main direction of travel beyond the predetermined limit line, i.e. in the aforementioned rear area.

In the case of a manual adjustment of the vehicle seat in longitudinal direction, the pressers can simply be taken along by the upper seat rails of the longitudinal adjustment rails. For this purpose, the pressers may also be firmly fastened to the upper seat rails or these may be formed as projections or the like directly thereon.

In the case of an electrically actuated longitudinal adjustment, the pressers may be formed as sections of electrically actuated longitudinal adjustment devices accommodated in the longitudinal adjustment rails, in particular as sections of electrically actuated spindle or worm drives, for example, as sections of the housings of such spindle or worm drives, or as projections provided directly on such housing sections. These sections are automatically adjusted during the electrically operated displacement of the vehicle seat in the longitudinal direction of the longitudinal adjustment rails and thus also clearly indicate the position of the vehicle seat along the longitudinal adjustment rails. This position can be easily detected by the mechanical pretension of the fastening members when the fastening members extend into the interior of the longitudinal adjustment rails.

A particularly advantageous simple and cost-effective design in the case of an electrically actuated longitudinal displacement device is achieved if the pressers are formed directly as sections of electrically actuated spindle or worm drives which are slidably accommodated in the longitudinal adjustment rails and are also displaced when the vehicle seat is displaced.

According to another embodiment, the front and rear edges of the pressers, if viewed in the longitudinal direction of the longitudinal adjustment rails, are beveled. When the front or rear edge of the pressers is reached and a further longitudinal adjustment is performed, the fastening members can thus be gently and gradually pressed further and further down by the pressers in order to release the engagement with the mating members.

According to another embodiment, the mating members are arranged near their rear ends, if viewed in the longitudinal direction of the longitudinal adjustment rails, which helps to define the transition area between the aforementioned front area and the aforementioned rear area in a particularly simple manner. By selecting the position and length of the mating members, in particular of the slot holes, the position of the aforementioned limit line and the length of the aforementioned rear area can be easily defined.

According to another embodiment, the front and rear edges of the fastening members, if viewed in the longitudinal direction of the longitudinal adjustment rails, are beveled. When pressed further down by the pressers and reaching the front or rear edge of the aforementioned mating members, especially of the slot holes, the fastening members can thus gradually be pressed down more and more by the undersides of the longitudinal adjustment rails until the engagement with the mating members is finally completely released.

According to a further embodiment, the position of the aforementioned limit line, if viewed in the longitudinal direction of the longitudinal adjustment rails, is predetermined by an area in a vehicle in which the vehicle seat is located outside a range of action of a front airbag, which corresponds to the range of the aforementioned novel seat positions in connection with 'autonomous driving' or the aforementioned relax positions in which the vehicle seat is located clearly 'behind' those driver's seat positions in which front occupant protection systems, in particular front airbags, are effective.

According to a further embodiment, the fastening members are configured in such a way that they are mechanically unlocked when the vehicle seat is displaced in longitudinal direction and in the direction opposite to the main direction of travel by more than 300 mm, more preferably by more than 350 mm and even more preferably by more than 400 mm. Here, it is assumed that the area within which front occupant protection systems, in particular front airbags, are sufficiently effective corresponds to an adjustment length of not more than 300 mm, more preferably of not more than 350 mm or even more preferably of not more than 400 mm.

According to a further embodiment, the deformation members are configured as metal bellows, wherein bellows of identical configuration, in particular bellows with symmetrical contours, are provided at the front and rear ends of the seat rail module. With such deformation members, a suitable characteristic curve for the deformation in the event of a crash can be specified by means of simple and inexpensively available standard elements. The bellows are preferably contour-symmetrical in themselves and can therefore withstand both tensile and compressive loads. By using them as deformation members at the front and rear, identical deformation characteristics can be easily specified. The front and rear deformation members are interchangeable, so that they can be installed as identical parts, even when the seat rail module is assembled.

According to another embodiment, the bellows are also assigned compression or tension rods in order to further modify the deformation characteristic of the bellows in a suitable manner. In this way, a first deformation range can be easily specified in which the impact energy is increasingly reduced by deformation of the bellows. When this deformation range has been used up, for example in the event of a particularly violent crash, the deformation characteristic curve of the bellows then rises abruptly in a second deformation range, so that significantly more impact energy is absorbed once this state is reached, because significantly more energy is required to deform the additional compression or tension rods. The characteristic curve of the deformation can be easily adjusted in the second deformation range by selecting the material, diameter/length ratio and other parameters that influence the buckling behavior.

According to a preferred further embodiment, the compression or tension rods are accommodated in the middle of the bellows. The wall of the bellows guides and secures the additional compression or tension rods and prevents in particular uncontrolled flying around of fragments in case of buckling of the compression or tension rods in the event of a particularly violent crash.

According to a further embodiment, secondary fastening members are also provided which keep the seat rail module permanently fastened to the floor of the vehicle body, in particular even after the locking of the fastening members has been released when the vehicle seat is displaced in longitudinal direction and in the direction opposite to the main direction of travel beyond the predetermined limit line. In this process, the secondary fastening members couple the vehicle seat to the floor of the vehicle body less rigidly, so that the secondary fastening members are released in the event of a crash, i.e. if a predetermined minimum force in the main direction of travel or in the opposite direction is exceeded. When the secondary fastening members are released in the event of a crash, when the aforementioned rear area of the vehicle seat is occupied, impact energy can thus already be dissipated by means of the secondary fastening members before the impact energy is then further dissipated by further deformation of the aforementioned deformation members. According to the present invention this leads to sufficient passenger safety even if the vehicle seat adopts one of the aforementioned novel seat positions in connection with 'autonomous driving' or the aforementioned relax positions, without the need for electronic control systems and sensors.

According to another embodiment, the secondary fastening members are formed as pins which project vertically from the underside of the longitudinal adjustment rails or from the floor of the vehicle body and engage in mating cylindrical receptacles formed in the floor of the vehicle body or on the underside of the longitudinal adjustment rails. The mechanical characteristics of these pins or projections and their positive engagement in the corresponding receptacles defines in an advantageously simple manner the rigidity of the mechanical coupling of the vehicle seat with the floor of the vehicle body in the aforementioned rear area.

In the case of normal loads, such as during normal driving or when the vehicle seat is displaced in longitudinal direction, the secondary fastening members reliably secure the vehicle seat. Only when an acceleration threshold is exceeded in the event of a crash are the pins or projections finally sheared off, whereby, when the pins or projections are sheared off in the event of a crash, impact energy can be dissipated to a very considerable extent, even if the vehicle seat is initially positioned in an area in which front-passenger protection systems, in particular front airbags, are not yet sufficiently effective at this point in time of a crash.

According to a further embodiment, the secondary fastening members comprise central pins which are each arranged between pins near a front and rear end of the longitudinal adjustment rails, if viewed in the longitudinal direction of the longitudinal adjustment rails, in particular substantially centrally in the longitudinal direction of the longitudinal adjustment rails, wherein the central pins are each accommodated without play or substantially without play in the mating cylindrical receptacles. The central pins thus represent the shortest chain of tolerance to the locking or fastening member in the longitudinal direction of the vehicle or in the longitudinal direction of the rails, so that the central pins directly provide a first trigger value in the event of a crash.

According to another embodiment, the pins near the front and rear end of the longitudinal adjustment rails, if viewed in the longitudinal direction of the longitudinal adjustment rails, are each accommodated with greater play in the mating cylindrical receptacles than the central pins, whereby further trigger values are defined in a delayed manner in the event of a crash.

OVERVIEW ON DRAWINGS

In the following, the invention will be described in an exemplary manner and with reference to the attached drawings, from which further features, advantages and problems to be solved may be derived. In the drawings:

FIG. 1 shows a seat rail module according to the present invention and its arrangement in a passenger compartment of a motor vehicle in a schematic side view;

FIG. 2a shows a first embodiment of a seat rail module according to the present invention in a normal state with relatively rigid coupling of the seat rail module with the floor of a vehicle body in a state immediately before a mechanical unlocking of the fastening members;

FIG. 2b shows the seat rail module according to the first embodiment in a state after a mechanical unlocking of the fastening members by adjusting the vehicle seat backward in a direction opposite to a main direction of travel;

FIGS. 2d and 2e show in a partial sectional view the state of a deformation member at a rear end of a seat rail module according to the present invention in a state before a crash and after a crash, in particular after a front crash;

FIG. 3a shows the state of a deformation member at a front end of a seat rail module according to a second embodiment according to the present invention in a state before a crash;

FIG. 4b shows how the secondary fastening members are accommodated in associated receptacles in the seat rail module of FIG. 4a.

Figure 2C:
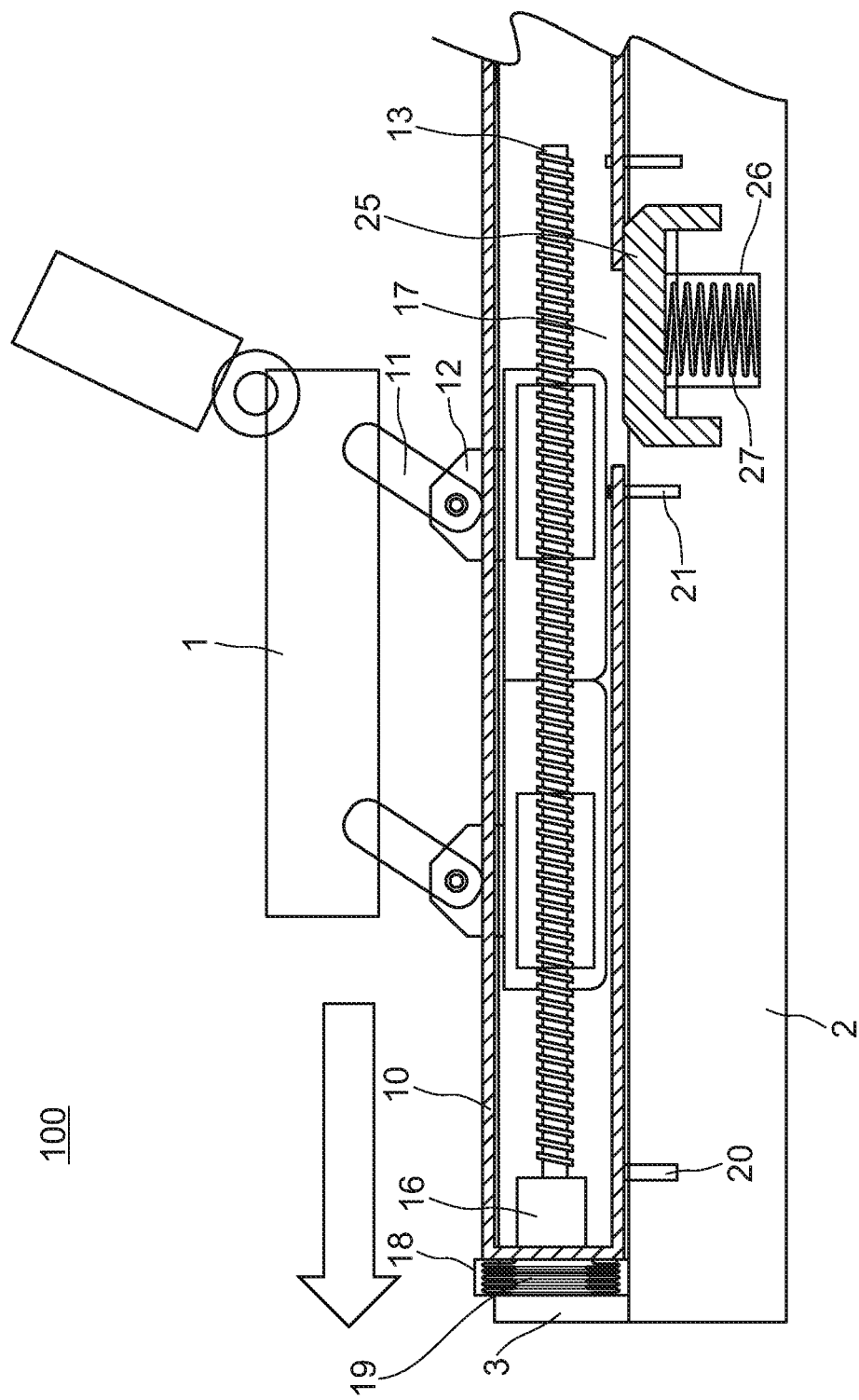
FIG. 2c shows the state of the seat rail module of FIG. 2a in a state after a mechanical unlocking of the fastening members by displacement of the vehicle seat backwards in a direction opposite to a main direction of travel beyond a predetermined limit line and after a deformation of deformation members in the event of a crash, in particular after a front crash.

In the drawings, identical reference signs denote identical or essentially equivalent elements or groups of elements.

DETAILED DESCRIPTION OF PREFERRED EMBODIMENTS

FIG. 1 shows in a schematic side view a seat rail module 100 according to the present invention and its arrangement in a passenger compartment of a motor vehicle. The floor 2 of the vehicle and a front connecting section 3 thereof are shown here only schematically and are suitably configured in accordance with the specifications of the vehicle manufacturer. In particular, the front connecting section 3 is intended to serve to support the seat rail module 100 in forward direction in the event of a crash, i.e. in the direction of the main direction of travel 7. According to FIG. 1, the seat rail module 100 comprises two longitudinal adjustment rails 10 extending in parallel to each other, which are fastened to the vehicle floor 2, wherein the longitudinal adjustment rails 10 each comprise a lower rail, which is connected to the vehicle floor 2, and an upper rail, which is mounted so as to be displaceable in longitudinal direction with respect to the lower rail and to which the vehicle seat 1 is fastened by means of connecting levers 11.

For FIG. 1 it is assumed that in the left-hand part of the seat rail module 100 front occupant protection systems, in particular front airbags, are sufficiently effective, but that the front occupant protection systems, in particular front airbags, are finally no longer sufficiently effective, when the vehicle seat 1 is displaced to the rear beyond the limit line 8, i.e. in the right-hand part of the seat rail module 100. For displacement of the vehicle seat 1 to the rear of the vehicle, it may be necessary to fold down the rear vehicle seat 1 or to move it back to a stowage position as indicated by the dotted area designated by reference sign 1', in order to extend the rearward displacement of the front vehicle seat 1. This rearward area may be due to new interior concepts of motor vehicles in connection with 'autonomous driving', in which the vehicle seat may be displaced significantly rearwards, or may also be due to the adoption of relax positions as seat positions, in particular of a front passenger. In these positions, vehicle seat 1 is not necessarily upright, so that it will then also be positioned clearly 'behind' those driver seat positions in which front passenger protection systems, in particular front airbags, are effective.

FIG. 2a shows the further configuration of a seat rail module according to the present invention in a normal state with relatively rigid coupling of the seat rail module to the floor of a vehicle body. Here, the example of an electrically actuated longitudinal adjustment of the vehicle seat 1 is shown. In the functional position, a cavity is formed by the upper rail and the lower rail of the respective longitudinal adjustment rail 10, in which a threaded spindle 13 for longitudinal adjustment of the seat is accommodated. The threaded spindle cooperates with a gear or drive module 15, which is also accommodated in the cavity of the longitudinal adjustment rail 10 and may be accommodated in a housing 14. The gear or drive module 15 may be configured in one piece or, as shown in FIG. 2a, in two parts. The longitudinal adjustment of the vehicle seat is effected by electrically actuating the drive module 15 or by driving the gear module 15 in cooperation with the threaded spindle 13.

In the case of a mechanically actuated longitudinal adjustment rail, the section 14 may be formed directly by a projection or the like on the inside of the upper rail, the position of which directly indicates the position of the vehicle seat 1 in the longitudinal direction of the seat rail module 100.

According to FIG. 2a, a slot hole 17 is formed on the underside of the longitudinal adjustment rail 10 and a fastening or locking member 25 is accommodated in a recess 26 on or in the vehicle floor 2, which is resiliently biased against the underside of the longitudinal adjustment rail 10 by means of a compression spring 27. In a normal state of the longitudinal adjustment rail, when the aforementioned limit line is not exceeded or overrun to the rear and when the front occupant protection systems, in particular front airbags, are sufficiently effective, the upper section of the locking member 25 protrudes beyond the lower edge of the housing 14 or projection into the cavity of the longitudinal adjustment rail 10.

When the vehicle seat 1 and the upper rail of the longitudinal adjustment rail 10 are displaced further towards the rear, the lower edge of the housing or projection 14 (hereinafter generally referred to as the presser 14) finally comes into contact with the beveled front edge of the locking member 25. The position according to FIG. 2a corresponds to a position in the area of the predetermined limit line 8 according to FIG. 1, i.e. to the transition area between the front area in which the front occupant protection systems, in particular front airbags, are sufficiently effective and the rear area in which the front occupant protection systems, in particular front airbags, are no longer sufficiently effective.

When the vehicle seat 1 and the upper rail of the longitudinal adjustment rail 10 are displaced further towards the rear, the beveled front edge of the locking member 25 finally slides along the rear edge of the presser 14. For this purpose, the rear edge of the presser 14 may also be beveled or rounded as shown in FIG. 2b.

When the vehicle seat 1 and the upper rail of the longitudinal adjustment rail 10 are displaced further towards the rear, the locking member 25 is finally pressed down completely by the presser 14 so that the vehicle seat 1 can be displaced further towards the rear and beyond the predetermined limit line 8 (see FIG. 1), i.e. into the area in which the front occupant protection systems, in particular front airbags, are no longer sufficiently effective.

In this condition the beveled front and rear edges of the locking member are still positioned in the area of the slot hole 17 on the underside of the longitudinal adjustment rail 10.

In the normal state of the vehicle seat 1, i.e. in the area in front of the predetermined limit line 8 (see FIG. 1) in which the front occupant protection systems, in particular front airbags, are sufficiently effective, the vehicle seat 1 is coupled relatively rigidly to the floor 2 of the vehicle body via the longitudinal adjustment rails 10 and locking members 25. Furthermore, the longitudinal adjustment rails 10 are fastened to the floor 2 of the vehicle body via secondary fastening members 20, which are formed on the underside of the longitudinal adjustment rails 10, project vertically from them and engage in mating receptacles formed in the floor 2 of the vehicle body, resulting in a further increase in the rigidity of the coupling of the vehicle seat 1 to the floor 2 of the vehicle body.

In the state according to FIG. 2b, i.e. in the rear area after the predetermined limit line 8 (see FIG. 1) is exceeded or overrun, in which the front occupant protection systems, in particular front airbags, are no longer sufficiently effective, the locking members 25 are decoupled and the vehicle seat 1 is coupled to the floor 2 of the vehicle body less rigidly than in the normal state only via the secondary fastening members 20 on the underside of the longitudinal adjustment rails 10.

Deformation units 18, which are arranged at the front ends of the longitudinal adjustment rails 10 and preferably also at the rear ends of the longitudinal adjustment rails 10 and which are deformed in the event of a crash, when the longitudinal adjustment rails 10 are displaced towards the front connecting section 3 due to the high acceleration forces then prevailing, serve as restraint measures in both areas in the event of a crash in order to further reduce the impact energy and absorb it by deformation. According to FIG. 2b, the deformation units 18 comprise bellows 19 made of a metal for this purpose. Bellows are known from industrial production and are used, inter alia, as flexible pipe connectors or also shaft couplings for torque transmission in the case of shaft ends which are not securely aligned. In the event of a front crash, compressive forces act on the front deformation members 19 and corresponding tensile forces act on the rear deformation members 19. In the event of a rear crash, the opposite situation arises, namely tensile force act on the front deformation members 19 and compressive force act on the rear deformation members 19. Metallic bellows of the same design are preferably used for the front and rear deformation members 19. Thus, a direction-independent modular character is provided here, in which identical parts can be used. Since two front deformation members 19 and two rear deformation members 19 always work together, these can be designed with a correspondingly lower individual load.

FIG. 2c shows the condition of the seat rail module of FIG. 2a after a deformation of the deformation members 19 in the event of a crash as indicated by the arrow. More specifically, FIG. 2c shows the conditions in the event of a front crash. In this condition, the metallic bellows 19 at the front end of the longitudinal adjustment rails 10 are irreversibly compressed, so that the longitudinal adjustment rails 10 are displaced even further forward towards the connecting section 3. The rear edge of the slot hole 17 finally slides over the beveled rear edge of the locking member 25 and finally the locking member 25 is pressed further down into the receptacle 26 by the undersides of the longitudinal adjustment rails 25. In this state, the crash-induced impact energy has been further reduced by deformation of the secondary fastening members 20, 21, in particular by bending or even shearing off the pins 20, 21 from the undersides of the longitudinal adjustment rails 10. A comparison of FIGS. 2b and 2c clearly shows the significantly changed position of the fastening members 20, 21 caused by the crash.

In correspondence to the condition of the deformation members 19 at the front ends of the longitudinal adjustment rails 10, FIGS. 2d and 2e show in a partial sectional view the condition of the deformation members 19 at the rear ends of the longitudinal adjustment rails 10 before and after a crash-induced deformation, in particular caused by a front crash. A comparison of FIGS. 2d and 2e clearly shows the significantly changed position of the secondary fastening members 20 caused by the crash.

As will be readily apparent to the person skilled in the art, the deformation members 19 at the front ends of the longitudinal adjustment rails 10 are stretched accordingly in the event of a rear-end crash and the deformation members 19 at the rear ends of the longitudinal adjustment rails 10 are compressed accordingly in the event of a rear-end crash.

Figure 3B:
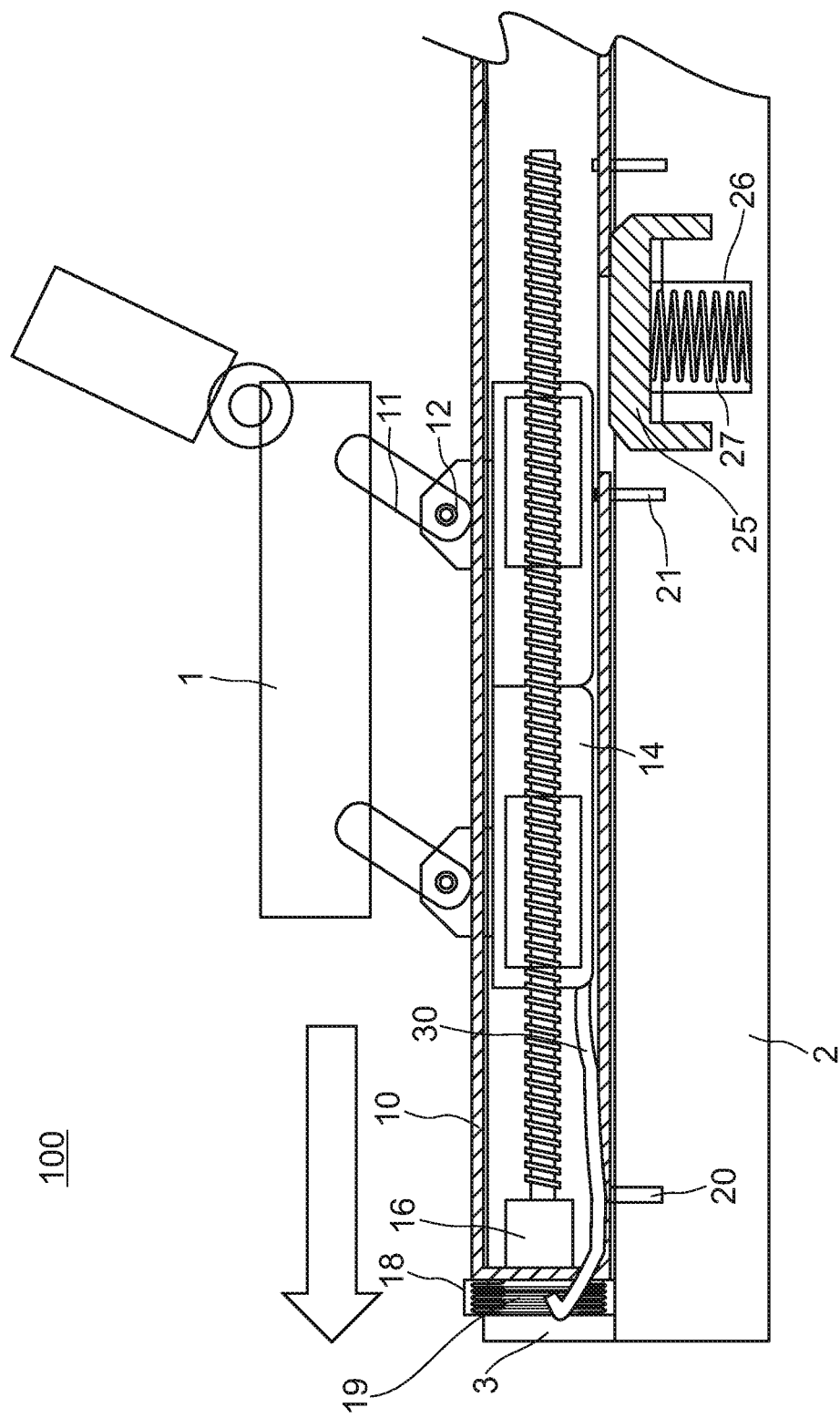
FIG. 3b shows the state of the deformation member at a front end of the seat rail module of FIG. 3a in a state during a crash or after a crash, respectively.

FIG. 3a shows the condition of a deformation member at a front end of a seat rail module according to a second embodiment according to the present invention in a state before a crash (front crash). Compression rods 30, which are expediently configured as a cylindrical rod made of a metal, in particular of a steel, are associated to the deformation members 19 at the front ends of the longitudinal adjustment rails 10. Preferably the compression rods 30 are arranged within the deformation units 19, particularly preferably within the cavity of the deformation members 19 which are configured as metallic bellows. The compression rods 30 are rigidly connected to the upper rails of the longitudinal adjustment rails 10 or to the housing or presser 14 which is accommodated in the cavity of the longitudinal adjustment rails 10. At the beginning of the rear area, i.e. after the predetermined limit line 8 (see FIG. 1) is exceeded or overrun in the event of a crash and at the beginning of the deformation of the deformation members 19, the front ends of the compression rods 19 are still arranged at a distance from the connecting section 3 at the front end of the vehicle floor 2. Only when the deformation members 19 are further deformed in the event of a crash and when the longitudinal adjustment rails 10 are pushed further forward the front ends of the deformation members 19 finally come into contact with the connecting section 3 at the front end of the vehicle floor 2 and are then deformed as shown in FIG. 3b until they can finally break off or buckle. By combining deformation member 19 and compression rod 30, an even stronger braking effect can be achieved and the impact energy in the event of a crash can be reduced even more.

As will be readily apparent to the person skilled in the art, tension rods may be associated to the deformation members 19 at the rear ends of the longitudinal adjustment rails 10 in a corresponding manner. Conveniently, these are designed as a cylindrical rod made of a metal, in particular of steel, whereby acceleration forces caused by a crash can also be correspondingly reduced in the opposite direction.

Figure 3C:
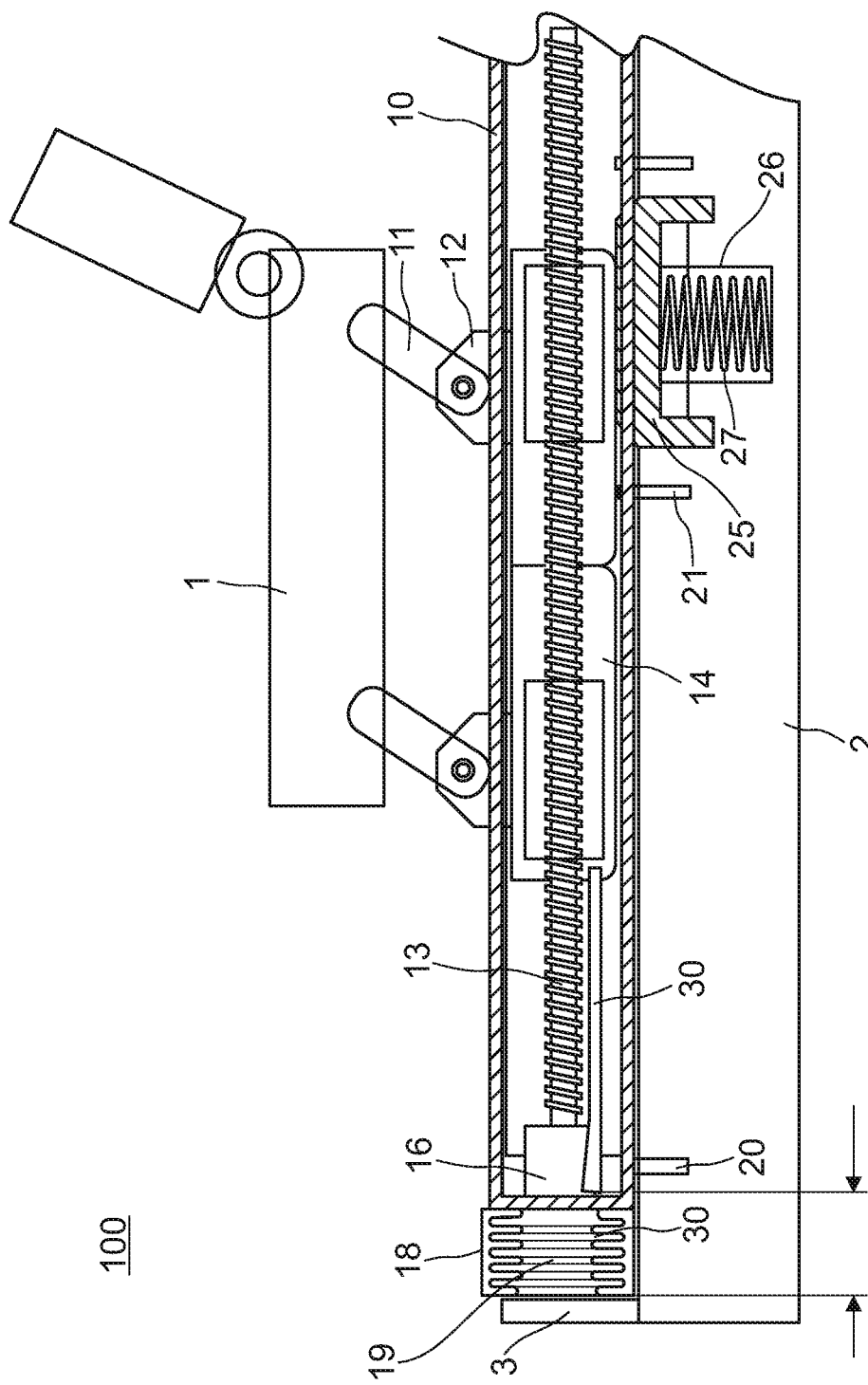
FIG. 3c shows the state of the deformation member at the front end of the seat rail module of FIG. 3a in a state after the vehicle seat is displaced rearward by a predetermined distance in a direction opposite to a main travel direction.

As will be readily apparent to the person skilled in the art, these compression or tension rods 30 are arranged in relation to the deformation members 19 in such a way that, when the vehicle seat is located within the front area in which front occupant protection systems, in particular front airbags, are effective, i.e. with locking members 25 being locked, as shown in FIG. 3c, they are not in contact with connecting sections 3 with the floor 2 of the vehicle body. By means of the positions of the front or rear ends of the compression or tension rods 30, the course of the characteristic curve of the deformation members 19 can be further adjusted.

Figure 4A:
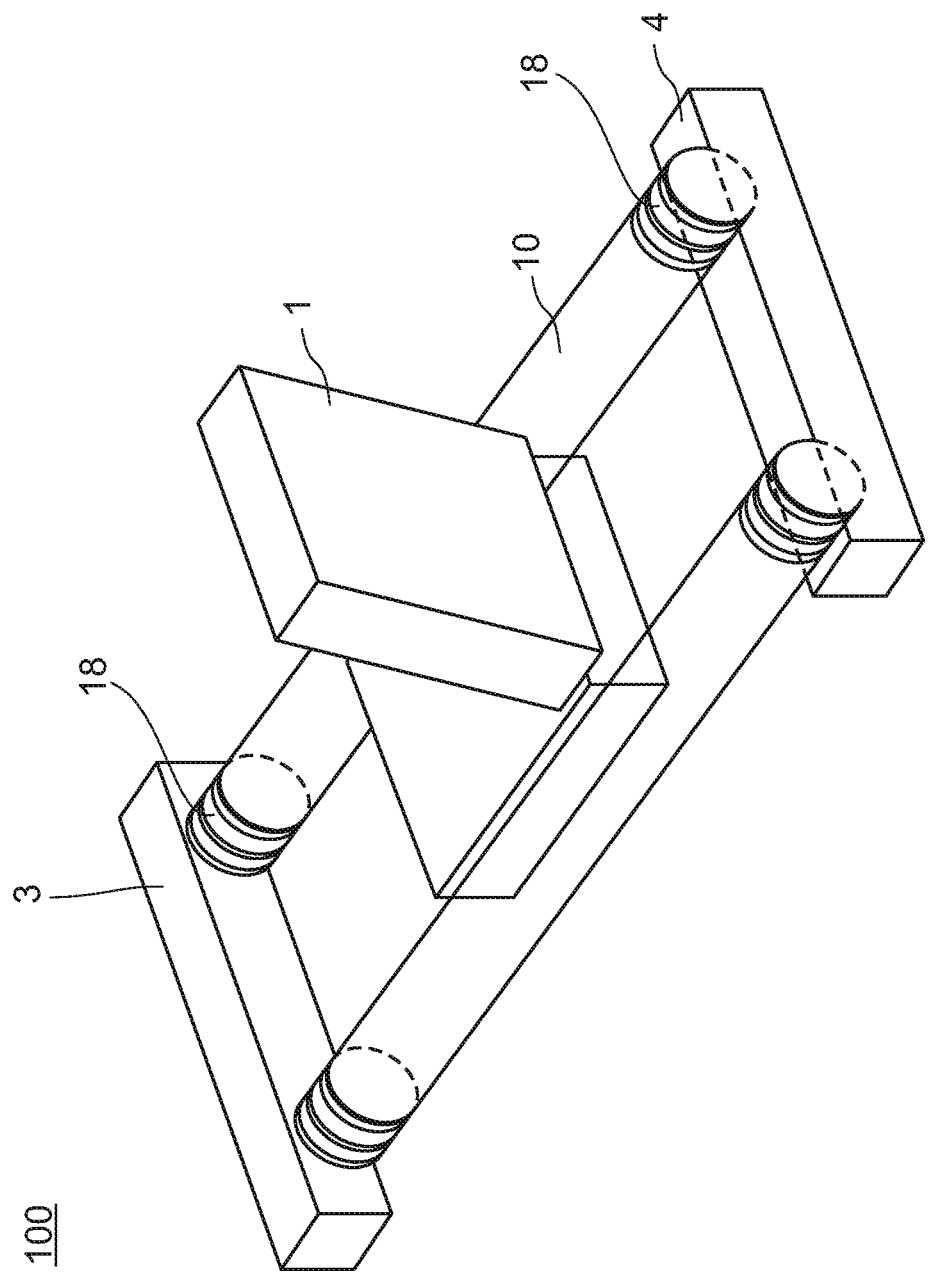
FIG. 4a shows a seat rail module according to a further embodiment of the present invention in a schematic perspective view.

FIG. 4a shows a seat rail module according to a further embodiment of the present invention in a highly simplified schematic perspective view. Finally, FIG. 4b shows the mounting of the secondary fastening members 20, 21 in assigned receptacles 36 on the seat rail module of FIG. 4a. As shown in the left-hand part of FIG. 4b, the secondary fastening members comprise central pins 21 or projections, which, if viewed in the longitudinal direction of the longitudinal adjustment rails 10, are each arranged between pins 20 near a front and rear end of the longitudinal adjustment rails 10, in particular substantially at a central position, if viewed in the longitudinal direction of the longitudinal adjustment rails 10. If viewed in the longitudinal direction of the longitudinal adjustment rails 10, the central pins 21 are each accommodated without play or substantially without play in the mating receptacles 36. These central receptacles 36 may even be essentially cylindrical and correspond to the profile of the central pins 21. Furthermore, the pins 20 near the front and rear ends of the longitudinal adjustment rails 10, if viewed in the longitudinal direction of the longitudinal adjustment rails 10, are each accommodated with greater play in the mating front and rear cylindrical receptacles 36 than the central pins 21. This allows specific triggering thresholds to be set for shearing off or deformation of the secondary fastening members, which are designed as pins 21, as described below.

When mounting the seat rail modules in the vehicle, a corresponding alignment concept may also be implemented. Usually, bases A, B and C are used here, as shown in FIG. 4b. If one assumes that the floor supporting surface of the seat rail module represents the base A and that the front and rear pin connection 20 represents the base B1 and B2, the final alignment of the seat rail module 100 with the central shear pin 21 is represented as base C. The central shear pin 21 represents the shortest tolerance chain to the locking member 25 in the longitudinal direction of the vehicle or in longitudinal direction of the rail. No relative movement is possible except for a minimum joint clearance (transition fit). Thus, the central shear pin 21 also acts as the primary element for defining the triggering threshold. It can thus be adapted primarily in diameter, material etc.

The above description represents the state with released locking member 25. When the locking member 25 is in the blocking or locking position, no relative movement of the seat rail modules relative to the vehicle body is possible. By aligning the seat rail modules via bases A, B and C, they can also be aligned very precisely with regard to the mechanical/geometric interface to the locking member 25, so that its operational safety, functional play, assembly etc. can also be carried out with a high degree of safety.

Due to the above concept for assembly, alignment and tolerance compensation, the front and rear shear pins 20 only come into active engagement after the middle shear pins 21 in terms of time and space in the event of crash-induced displacement of the seat rail module. The path to the first active engagement can also be influenced by the design of their mounting slots 36. In this manner, a certain gradation of the force/displacement characteristic of the overall system may also be achieved by minimal contour adaptations that are neutral in terms of overall mounting space. This means that positioning members that must be provided in any case in a similar way as disclosed herein (position, parallelism of the individual rails to each other, stop definition etc.), or their logical alignment design and position compensation are used here in an additional functionality that does not represent any additional expenditure as a matter of principle, but which results in a clear functional added value and double benefit.

In the area of the two middle shear pins 21, precise alignment in the main direction of travel is achieved, whereby only lateral play is permitted. In the area of the front and rear shear pins 20, there is sufficient play in the main direction of travel by appropriate engagement in the larger slot holes 36 for mounting. The deformation members 19 at the front and rear ends of the longitudinal adjustment rails 10 provide positional compensation between the alignment of the shear pins 20, 21 and the connecting sections 3 with fixed connection to the vehicle body. At the front and rear ends of the seat rail modules 10, the deformation members 19, in particular the bellows, automatically provide a flexible interface to compensate for the further tolerance chain in precisely aligned seat rail modules 10 for fixed connection to the vehicle body.

It is also advantageous that the slot holes 36 for mounting of the front and rear shear pins 20 may be configured differently in such a way that the specific differences of a front crash and rear crash in their load effect on the vehicle and occupants can be compensated in a very simple manner. In combination with the specific design of the rear shear pin 20 and its slot hole 36 in the seat rail module, for example, two independently adjustable parameters can be combined here, which in turn leads to a very delicate adaptability. Here too, the simplicity of the proposed system is evident, while at the same time offering maximum adaptability.

This results in a multi-stage system that can react flexibly depending on the crash event and is completely controlled by its internal logical structure. Parameters for setting and adjusting the behavior in the event of a crash may be in particular the following:

- an initial triggering threshold, which is defined by the central shear pin 21;
- a second triggering threshold, which is defined by the front shear pin 20;
- a third triggering threshold, which is defined by the rear shear pin 20;
- a fourth triggering threshold, which is defined by the front slot hole 36 used for mounting which delimits a displacement of the front shear pin 20 up to the stop;
- a fifth triggering threshold, which is defined by the rear slot hole 36 used for mounting, which delimits a displacement of the rear shear pin 20 up to the stop;
- a sixth triggering threshold, which is defined by the front deformation member 19 (see FIG. 2*a*); and
- a seventh triggering threshold, which is defined by the rear deformation member 19 (see FIG. 2*d*).

As will be apparent to the person skilled in the art, the pins 20, 21 may be further adapted and varied in number, material (shear strength) and diameter so that even different triggering thresholds can be 'set' depending on the vehicle by means of a standardized seat rail module.

LIST OF REFERENCE SIGNS 1 vehicle seat (seat backrest upright)
1' vehicle seat (seat backrest folded down)
2 floor of vehicle body
3 connecting section at front end of floor 2
4 connecting section at rear end of seat rail module
6 occupant
7 main direction of travel
8 limit line
10 longitudinal adjustment rail
11 connecting lever
12 connecting socket
13 threaded spindle
14 housing/presser
15 gear or drive module/spindle drive
16 connecting section for spindle 13
17 recess
18 deformation unit
19 deformation member, in particular metal bellow
20 secondary fastening member
21 central secondary fastening member
25 locking member
26 receptacle in floor 2 of vehicle body
27 pressure spring
30 additional deformation member
35 section of seat rail module
36 slot hole
100 seat rail module

The invention claimed is:

1. A seat rail module for use in a vehicle seat, the seat rail module comprising:
   two longitudinal adjustment rails configured to be arranged parallel to each other, wherein each of the longitudinal adjustment rails include an upper rail and lower rail, the upper rails are fastened to the vehicle seat, the two longitudinal adjustment rails configured to guide the vehicle seat as a position of the vehicle seat is adjusted in a longitudinal direction,
   deformation units configured to be fastened to the longitudinal adjustment rails, and
   fastening members configured to fasten the lower rails to a floor of a vehicle body, wherein
   the deformation units include deformation members, the deformation members configured to deform in response to displacement of the vehicle seat in a main direction of travel to decelerate the vehicle seat in the event of a crash, wherein
   in a normal state, the fastening members are configured to lock the seat rail module to the floor of the vehicle body, and
   the fastening members are configured to be mechanically unlocked upon in response to:
   a displacement of the vehicle seat in the longitudinal direction, and
   a displacement of the vehicle seat, in a direction opposite to the main direction of travel, beyond a predetermined limit line to a region in which one or more front occupant protection systems are ineffective and do not protect an occupant disposed in the vehicle seat.

2. The seat rail module of claim 1, wherein the fastening members are resiliently biased against the longitudinal adjustment rails, wherein in the normal state,
   the fastening members engage corresponding mating members formed on an underside of each of the longitudinal adjustment rails, and
   the fastening members are collectively configured to selectively disengage from the corresponding mating members in response to the displacement of the vehicle seat in the longitudinal direction and the displacement of the vehicle seat in the direction opposite to the main direction of travel beyond the predetermined limit line.

3. The seat rail module of claim 2, wherein the corresponding mating members are slotted holes formed on the underside of each of the longitudinal adjustment rails.

4. The seat rail module of claim 2, further comprising:
one or more pressers disposed in each of the longitudinal adjustment rails, wherein the one or more pressers are configured to disengage the fastening members from the corresponding mating members in response to the vehicle seat being displaced in the longitudinal direction and in the direction opposite to the main direction of travel beyond the predetermined limit line.

5. The seat rail module of claim 4, wherein the one or more pressers are entrained during a manual longitudinal displacement of the vehicle seat.

6. The seat rail module of claim 5, further comprising:
one or more longitudinal adjustment devices disposed in each of the longitudinal adjustment rails and configured to be electrically actuated to adjust the position of the vehicle seat, wherein sections of the one or more longitudinal adjustment devices form the one or more pressers.

7. The seat rail module of claim 6, wherein the one or more longitudinal adjustment devices include at least one of a spindle ef-and a worm drives drive, wherein the at least one of the spindle and the worm drive form the one or more pressers.

8. The seat rail module of claim 4, wherein at least one a front edge and a rear edge of the one or more pressers are beveled with respect to the longitudinal direction of the longitudinal adjustment rails.

9. The seat rail module of claim 2, wherein the corresponding mating members are arranged near a rear end of each of the longitudinal adjustment rails with respect to the longitudinal direction of the longitudinal adjustment rails.

10. The seat rail module of claim 1, wherein front and rear edges of the fastening members are beveled, with respect to the longitudinal direction of the longitudinal adjustment rails.

11. The seat rail module of claim 1, wherein the one or more front occupant protection systems includes a front airbag, wherein a position of the predetermined limit line, with respect the longitudinal direction, is based on a position of an area within the vehicle body in which the vehicle seat is disposed outside a range of action of the front airbag.

12. The seat rail module of claim 1, wherein the fastening members are configured in such a way that they are mechanically unlocked in response to the vehicle seat being displaced in the longitudinal direction and being displaced by more than 300 mm in the direction opposite to the main direction of travel.

13. The seat rail module of claim 12, wherein the fastening members are configured to mechanically unlock in response to the vehicle seat being displaced in the longitudinal direction and being displaced by at least 350 mm in the direction opposite to the main direction of travel.

14. The seat rail module of claim 1, wherein the deformation members are formed by metal bellows.

15. The seat rail module of claim 1, further comprising:
secondary fastening members configured to permanently fasten the seat rail module to the floor of the vehicle body, wherein the secondary fastening members are configured to be released in response to a force exceeding a predetermined minimum force threshold applied in the main direction of travel or the direction opposite the main direction of travel.

16. The seat rail module of claim 15, wherein the secondary fastening members are formed as pins or projections projecting vertically from at least one of an underside of the longitudinal adjustment rails and the floor of the vehicle body, and the secondary fastening members are configured to engage in corresponding cylindrical receptacles formed in the floor of the vehicle body or on the underside of each of the longitudinal adjustment rails.

17. The seat rail module of claim 16, wherein the secondary fastening members comprise central pins or projections, wherein each of the central pins or projections are, with respect to the longitudinal direction, disposed at a substantially central position and between pins disposed near a front end and a rear end of each of the longitudinal adjustment rails, wherein the central pins are each configured to be disposed in the corresponding cylindrical receptacles without play or substantially without play.

18. The seat rail module of claim 17, wherein the pins disposed near the front end and the rear end of each of the longitudinal adjustment rails are configured to be disposed in corresponding cylindrical receptacles with play that is greater than in-the play associated with the central pins.

19. The seat rail module of claim 1, wherein the deformation members are formed by bellows disposed at a rear end and a front end of the seat rail module and provided with substantially symmetrical contours.

20. The seat rail module of claim 19, wherein the deformation members further include at least one of one or more tension rods and one or more compression rods configured to cooperate with the bellows.

21. The seat rail module of claim 20, wherein the at least one of the one or more tension rods and the one or more compression rods are disposed in a middle portion of the bellows.

* * * * *